April 5, 1938. E. H. HINCHLIFFE 2,113,232
APPARATUS FOR REMOVING FEATHERS FROM FOWL
Filed Aug. 29, 1936 3 Sheets-Sheet 1
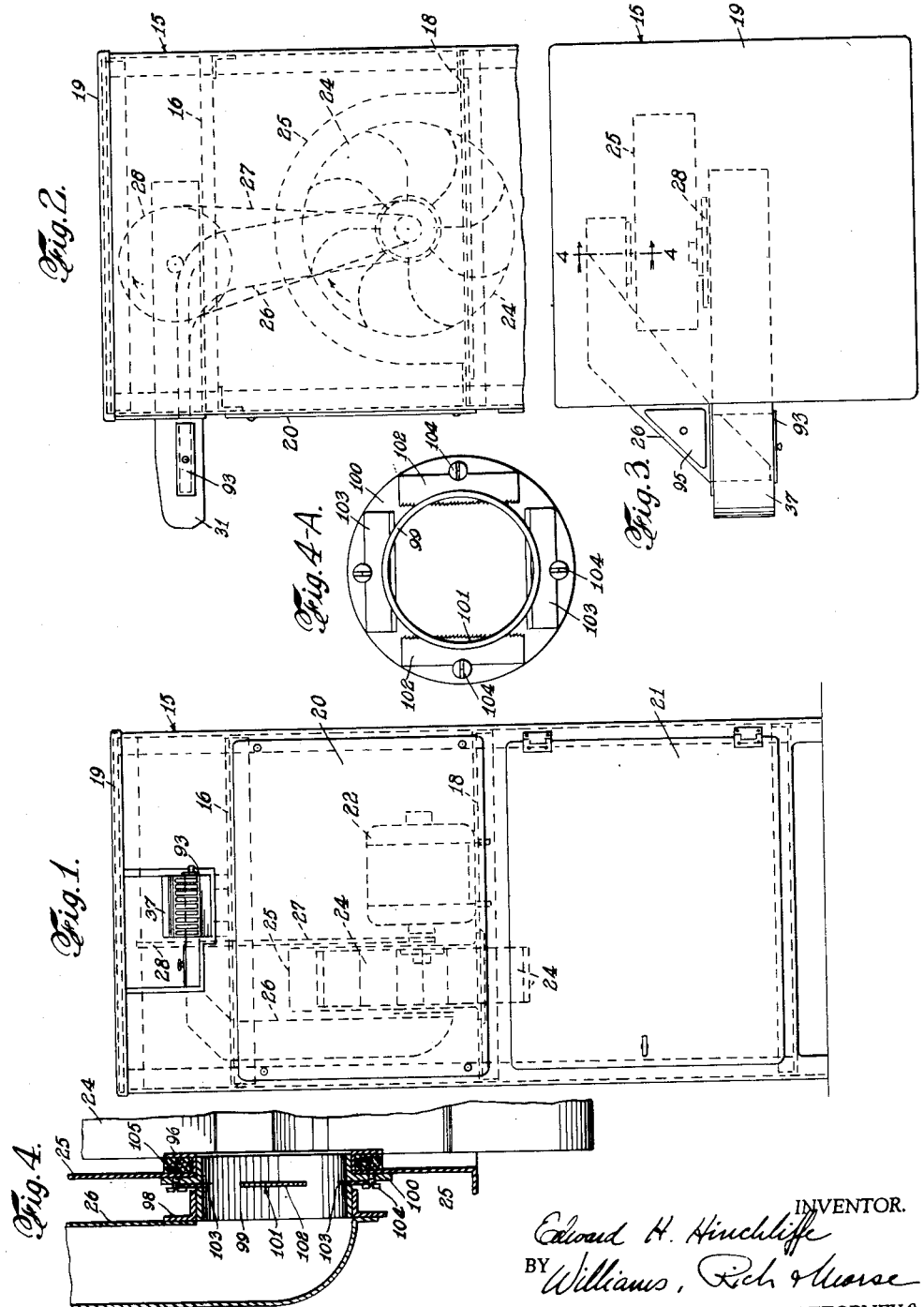
INVENTOR.
Edward H. Hinchliffe
BY Williams, Rich & Morse
ATTORNEYS April 5, 1938. E. H. HINCHLIFFE 2,113,232
APPARATUS FOR REMOVING FEATHERS FROM FOWL
Filed Aug. 29, 1936 3 Sheets-Sheet 2
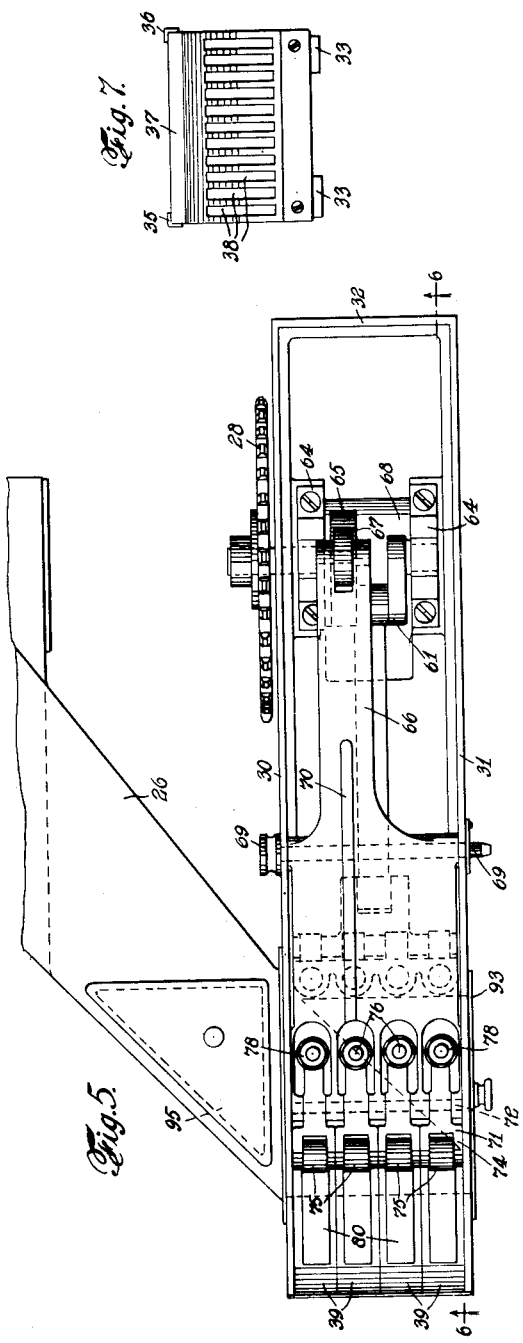
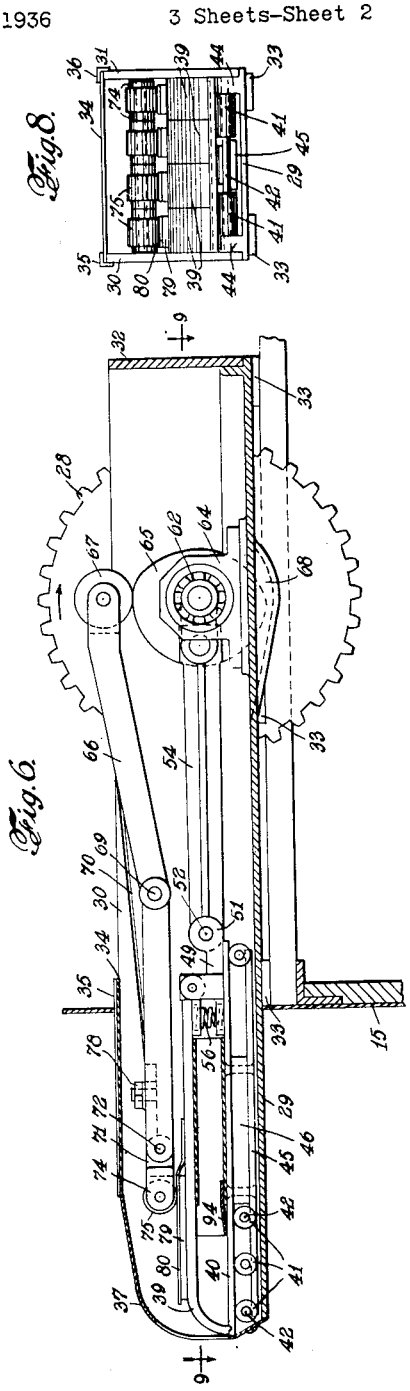
INVENTOR.
Edward H. Hinchliffe
BY Williams, Rich & Morse
ATTORNEYS April 5, 1938.                E. H. HINCHLIFFE                2,113,232
APPARATUS FOR REMOVING FEATHERS FROM FOWL
Filed Aug. 29, 1936                3 Sheets-Sheet 3
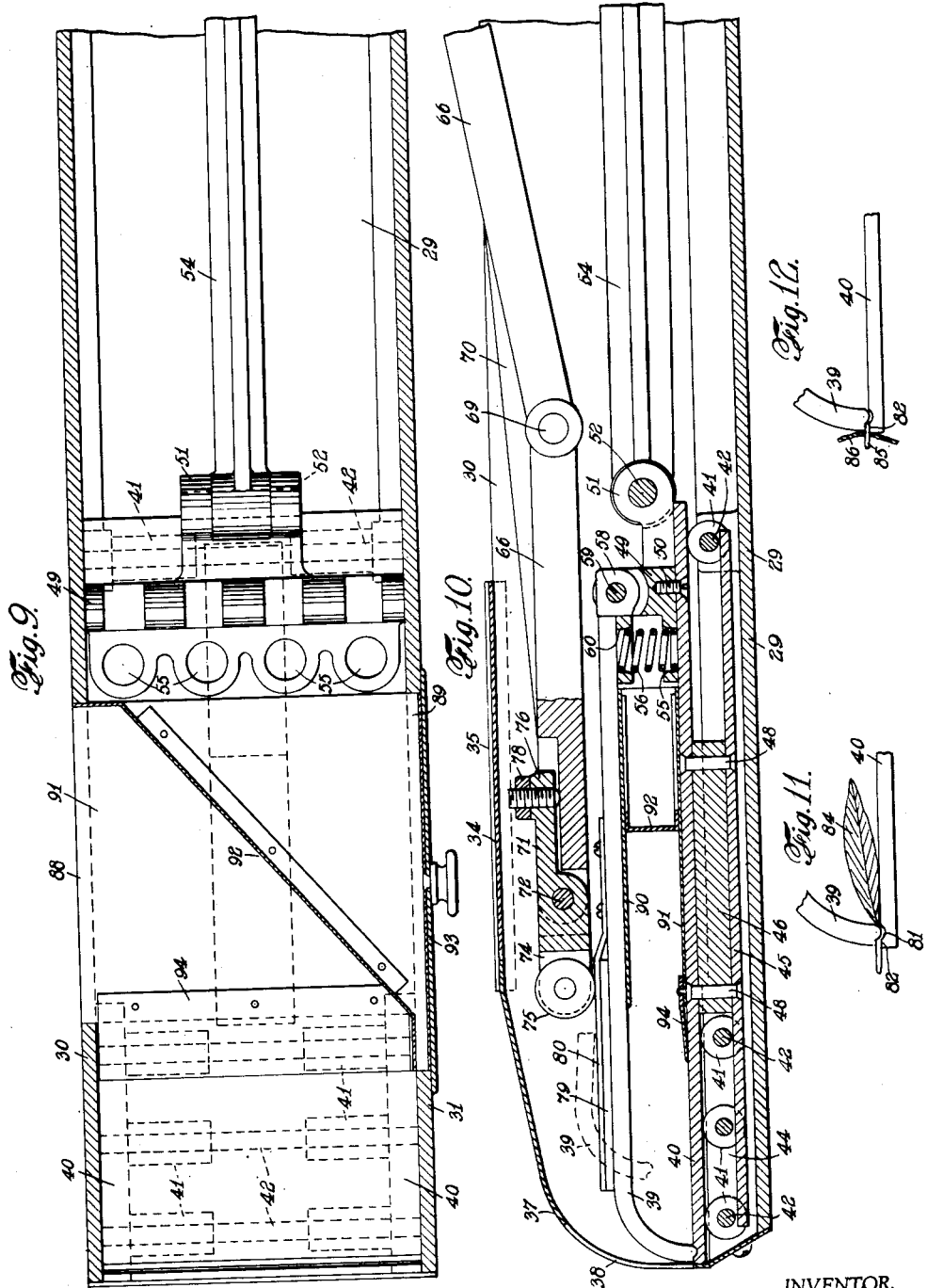
INVENTOR.
Edward H. Hinchliffe
BY Williams, Rich & Morse
ATTORNEYS Patented Apr. 5, 1938

2,113,232

UNITED STATES PATENT OFFICE 2,113,232

APPARATUS FOR REMOVING FEATHERS FROM FOWL

Edward H. Hinchliffe, Lynbrook, N. Y.

Application August 29, 1936, Serial No. 98,504

10 Claims. (Cl. 17—11.1)

This invention relates to apparatus for removing feathers from fowl, having for its primary object the provision of a machine capable of rapidly picking a bird clean of all feathers, including pin feathers, without injury to the skin.

A further object is to provide a unitary structure of attractive appearance containing the plucking mechanism, its source of power, means for creating a suction to carry the feathers into the plucking mechanism and away from it and having a compartment in which the feathers removed may be collected.

A principal feature of the invention is that the feathers may be grasped practically at their point of emergence from the skin so that even the shortest pin feathers are readily plucked. Other related objects are the provision of plucking members so shaped as to securely hold both large and small feathers and pin feathers; the provision of means for automatically cleaning the plucking members; and the construction of the plucking device so as to apply pressure to the feathers through a resilient medium while grasping them between metallic jaws.

A further object is to provide means for disintegrating long feathers so they will readily pass through the apparatus into the receptacle.

A still further object is to form the plucking device in a plurality of units so that it will have the ability to pluck both large and small feathers at the same time.

Other objects and advantages will be apparent from the following detailed description of the invention, present preferred embodiment of the invention, the novel features of which are particularly pointed out in the appended claims.

In the drawings:

Fig. 1 is a front elevation of a complete machine assembled in a cabinet;

Fig. 2 is a side elevation of the top part of the cabinet viewed from the right of Fig. 1;

Fig. 3 is a top view of the cabinet shown in Figs. 1 and 2;

Fig. 4 is a detail showing part of the blower and its connection to the chute taken on the line 4—4 of Fig. 3 and illustrating the device for disintegrating long feathers;

Fig. 4—A is a front view of the connecting collar between the chute and the blower, viewed from the left of Fig. 4;

Fig. 5 is a plan of the plucking mechanism and part of the chute;

Fig. 6 is a section through the plucking mechanism taken on the line 6—6 of Fig. 5;

Fig. 7 is an end view showing the guard plate covering the front end of the plucking mechanism as seen from the left of Figs. 5 and 6;

Fig. 8 is an end view of the plucking mechanism with the guard plate removed;

Fig. 9 is an enlarged plan of the plucking mechanism taken approximately on the line 9—9 of Fig. 6.

Fig. 10 is a side view of the device taken substantially along the center line of Fig. 9, but including certain parts omitted from Fig. 9;

Fig. 11 is a detail view of the gripper fingers showing how they operate to grasp a medium or large sized feather; and Fig. 12 is a similar view showing how the same gripper fingers take hold of a very small pin feather.

Similar reference numerals of the several figures indicate similar parts.

Referring to Figs. 1, 2 and 3, the device is assembled as a unitary structure in a suitable cabinet 15 which is divided into three compartments by horizontal partitions 16 and 18, the uppermost compartment housing most of the plucking mechanism, which partially protrudes through the front of the cabinet, the middle compartment housing the motor and the blower, and the lower compartment being adapted to receive receptacles into which the feathers removed from the fowl are deposited. Access to the top compartment is had through a removable top 19, the middle compartment is closed on the front by a removable panel 20 and the lower compartment is provided with a door 21.

The electric motor 22 is coupled directly to a blower 24, which has a housing 25, and extends through an opening in the partition 18 into the lower compartment. The chute 26 extends from an opening in the side of the plucking device into the cabinet and down through the partition 16 where it is attached to the housing 25 opposite the center of the blower, serving to carry feathers from the plucking device into the blower, from which they are exhausted into the lower compartment.

The shaft of the motor 22 is connected by any suitable driving member, such as the chain 27, to the sprocket wheel 28 which drives the plucking device.

Referring to Figs. 5 and 6, the plucking mechanism proper is assembled into a unit, the housing for which consists of the base 29, the two side plates 30 and 31 and the end plate 32. The base has supports 33 for mounting the unit. Outside the cabinet, or to the left of the wall 15 in Fig. 6, the mechanism is covered by a top plate 34 which slides under the two angular strips 35 and 36.

The front is covered with a guard plate 37 provided with slots 38 which serve to admit feathers to the plucking mechanism but which keep the skin from getting between the gripping fingers.

The plucking of feathers from a fowl is effected by the conjoint action of the suction produced by the blower, which tends to draw them through the slots 38 in the guard plate, and mechanical action of the gripping fingers 39 and the gripping plate 40, the construction and operation of which will now be described.

The gripping plate 40 has a reciprocating movement and the gripping fingers 39 have a compound movement consisting of reciprocation with the gripping plate and a movement toward and away from the gripping plate, the limits of which movements are illustrated in Fig. 10 wherein the gripping position is shown in full lines and the open position in dotted lines. The nature of this movement will be more fully understood after the description of the mechanism by which it is produced.

The gripping plate 40 rests upon rollers 41 which are carried on axles 42 having their bearings in lugs 44 which are integral with the base 29. The gripping plate 40 is retained against upward movement by the retainer plate 45 which is secured, together with the spacing block 46, to the gripping finger 40 by the rivets 48. The retainer plate 45 is so positioned as to lie between the rollers 41 and just beneath the axles 42, as may best be seen in Fig. 8.

At the rear of the gripping plate 40 (to the right in Fig. 10), the gripping plate hinge 49 is secured by screws 50. This hinge is provided at its rear with a centrally disposed bearing member 51 to receive the wrist pin 52 of the connecting rod 54. The forward edge of the hinge 49 is provided with four cups 55 adapted to receive the coil springs 56. To the top of the hinge 49 are pivoted four gripping-finger hinges 58 which have a common pivot in the hinge pin 59. This pin is prevented from endwise movement by reason of the fact that it is between the side plates 30 and 31. The hinges 58 are rigidly secured to the gripping fingers 39 in any suitable manner and are provided with cups 60 for retaining the upper ends of the coil springs 56. It will be observed therefore that the gripping fingers 39 are in effect pivoted to the gripping plate 40 and are urged away from that plate by the springs 56. Reciprocating movement is imparted to the mechanism just described through the connecting rod 54 from the crank shaft 61, which is mounted in ball bearings 62 carried by the bearing blocks 64 mounted on the base 29. The crank shaft 61 is extended through the side plate 30 on the outside of which the sprocket wheel 28 is keyed to it.

Also mounted on the crank shaft 61 is a cam 65 which imparts movement to the rocker arm 66 through the cam follower 67 as the cam is rotated. The base 29 is provided with a sump 68 to provide clearance and hold lubrication for the cam and crank.

The rocker arm 66 at its forward end extends across the full width of the space between the plates 30 and 31 and is pivoted on a pin 69 which is inserted in bearings in said plates. The rocker arm 66 is preferably strengthened by a rib 70.

To the forward end of the rocker arm 66, four pressure roller arms 71 are pivotally mounted on a pin 72. Each of these arms is provided at its forward end with a yoke 74 in which a pressure roller 75 is rotatably mounted. The pressure roller arms 71 are adjustable with respect to the rocker arms 66, upon which they are pivoted, by means of the adjusting bolts 76 which are provided with the lock nuts 78.

On the top of each of the gripping fingers 39 is a pressure equalizing pad 79 of rubber or other suitable resilient material, each of these pads being covered with a metal retaining cap 80 which is screwed or otherwise secured to the gripping fingers. The rollers 75 press against these metal caps 80. Spring members might be substituted for the resilient pads within the scope of the invention.

Referring to Fig. 11, particular attention is called to the shape of the ends or jaws of the finger 39 and plate 40. The plate 40 is provided, slightly to the right of its forward edge, with an arcuate depression 81 which leaves a short flat portion 82 at the edge of the plate. The end of the finger 39 is made to conform to the configuration of the plate 40 so that the two surfaces are complementary. The surface comprising the groove 81 and the flat portion 82 may be either smoothed or roughened, but it has been found that smooth surfaces work very satisfactorily. When the jaw has gripped an average or large sized feather, as shown at 84, a slight bend is put in the feather when the pressure is applied, which holds it very securely.

Referring to Fig. 12 it will be noted how the flat portions of the gripping members are adapted to grasp very small pin feathers, as shown at 85, which protrude but slightly from the skin of the fowl represented at 86.

From the foregoing description of the mechanism it may now be understood that as the crank shaft 61 and the cam 65 revolve, the connecting rod 64 imparts a reciprocating movement to the gripping members 39 and 40, and that as they are moved back and forth the cam raises and lowers the rocker arm 66 which presses upon the tops of the gripping fingers 39 to move them toward the gripping plate 40, the movement away from that plate being produced by the springs 56 when the pressure from the rocker arm 66 is released. The gripping fingers move forward toward the guard plate 37 in open position and are closed just as they reach the guard plate, after which they are immediately retracted therefrom in the plucking stroke, carrying with them any feathers which they may have grasped. As previously stated, the blower 24 produces a rush of air which draws the feathers in through the guard plate and between the gripping members. It will be noted that the gripping fingers 39 close down against the plate 40 right behind the guard plate 37 so that they are separated from the skin of the fowl only by the thickness of the guard plate, which may be of thin sheet metal. The device will thus pluck pin feathers extending but a small fraction of an inch. Upon the completion of the plucking stroke the gripping members open, releasing the feathers, which are then sucked down the chute 26.

Referring to Fig. 9, the chute 26 is attached to the plucking mechanism at the opening 88 in the side plate 30. Directly opposite this opening is a corresponding opening 89 in the side plate 31. In order to divert the feathers into the chute and keep them away from the mechanism in rear thereof, a drawer-like member is inserted in the opening 89, which member comprises the top plate 90 and the bottom plate 91, between which is the diagonally extending baffle 92, and the front 93.

For the purpose of keeping the gripping plate 40 clear of feathers which might adhere thereto a scraping member 94, formed of spring steel, is secured to the forward edge of the bottom plate 91. The edge of this scraper presses against the gripping plate 40, and as it is reciprocated it continuously cleans it. The baffle 92 and its associated members are removable to give access to the interior of the mechanism for the purpose of clearing out any obstruction that might occur. For a similar purpose the chute 26 is provided with a clean-out port 95, shown in Fig. 5.

The function of the pressure equalizing pads 79 is particularly important. It will be observed that four gripping fingers 39 are shown, all of which are depressed by the same member, namely, the rocker arm 66. In plucking fowl, both large and small feathers will be grasped by the mechanism simultaneously and the presence of a large quill between one gripping finger and the gripping plate may hold it open to such an extent that smaller feathers will not be grasped with sufficient tension to withdraw them from the skin. By providing each gripping finger with its separate equalizing pad, one finger may be depressed sufficiently to grasp very small feathers while its adjacent finger is nevertheless held open by large feathers. Another important function of these pads is to prevent any tendency of the gripping members to chop off the feathers, as would be the case if there were no point at which the mechanical movement might yield. The machine is adjusted by means of the bolts 76 so that the pads are put under substantial compression while the cam follower 67 is traversing the highest segment of the cam but with a margin of possible further compression sufficient to accommodate the quill of a large feather.

When very long feathers, such as tail feathers, come down the chute 26, they may be so long as not to pass out through the blower 24, in which case they will simply enter the center of the blower and whip around with it. In order to disintegrate such feathers mechanism has been provided which will now be described in connection with Figs. 4 and 4—A.

The connection between chute 26 and the blower 24 comprises the flange 96 which is fastened to the blades of the blower and rotates with it, the stationary collar 98 which is fastened on the chute 26 and the flanged collar 99 which has a friction fit with the collar 98 and the fan housing 25. A felt ring 105 is interposed between the housing 25 and the blower flange 96. Referring to Fig. 4—A, the collar 99 is provided with the circumferential flange 100. Adjacent this flange four slots 101 are sawed through the collar 99, of such dimensions that short sections of saw blade 102 or knives 103 will fit snugly therein. These blades are held in position by the screws 104 under which they may be slid in or out. Any number of saws or knives, or both, from one to four, may be utilized as conditions require. As a long feather whips about in the collar 99, it will strike the blades with rapid glancing blows and will be rapidly cut into short pieces which will pass through the blower 24.

It is of course to be understood that the foregoing detailed description is of an illustrative embodiment of the invention in which various changes of construction and detail are contemplated within the purview of the invention.

What is claimed is:

1. In a fowl plucking device, in combination, a reciprocating plate, a gripping member pivotally associated with said plate, rotary driving means for reciprocating said plate and said member, a cam rotating with said driving means, and a rocker arm actuated by the cam and arranged to press said member against said plate during the plucking stroke.

2. A fowl plucking device comprising a reciprocating plate, a plurality of gripping members separately pivotally carried by said plate, rotary driving means for reciprocating said plate and said member, a cam rotating with said driving means, and a rocker arm actuated by the cam and adapted to press said members toward said plate during the plucking stroke.

3. A fowl plucking device comprising a reciprocating plate, a plurality of gripping members separately pivotally carried by said plate, rotary driving means for reciprocating said plate and said member, a cam rotating with said driving means, a rocker arm actuated by the cam and adapted to press said members toward said plate during the plucking stroke, and resilient members between the rocker arm and the gripping members through which the pressure is applied.

4. A fowl plucking device comprising a plate slidably mounted for reciprocating movement, gripping fingers pivotally carried upon said plate, resilient means for urging said fingers away from said plate, driving mechanism including a cam, and a rocker arm actuated by said cam and provided with members adapted to press said fingers against said plate during the plucking stroke.

5. A fowl plucking device comprising a drive shaft having a crank and a cam, a slidably mounted plate operatively connected to said crank so as to reciprocate, a gripping finger pivotally carried by said plate and having its body portion spaced therefrom, resilient means for urging the plate and finger apart, a rocker arm pivotally mounted above said finger, actuated by said cam, and adapted to press said finger toward said plate, and resilient means intermediate said arm and said finger for transmitting the pressure from said arm.

6. A fowl plucking device comprising a housing, an apertured guard across an end of the housing, a plate within the housing mounted to reciprocate up to and away from said guard, gripping members carried by said plate and pivoted for movement toward and away from it as it reciprocates, means for creating a flow of air through said guard, an outlet passage for the air in said housing, and a deflecting baffle lying between said plate and said members to direct the air stream into said passage.

7. In a fowl plucking device having a reciprocating plate and a cooperating gripping member adapted to grasp feathers between their abutting surfaces and after plucking the feathers to open and release them, means for cleaning said plate comprising a stationary scraper pressing against said plate and so positioned that it scrapes the gripping surface of the plate as the plate reciprocates.

8. In a fowl plucking device having a pair of feather plucking members comprising a reciprocating plate and a gripping plate which opens and closes with respect thereto, jaws on said members having complementary surfaces which provide at the forward edges of the plucking members a short flat gripping section substantially in the plane of movement of said plate, adjacent which is a gripping section shaped to put a bend in a feather gripped therein.

9. In a fowl plucking device having a pair of feather plucking members comprising a reciprocating plate and a gripping plate which opens and closes with respect thereto, jaws on said members having complementary surfaces which provide at the forward edges of the plucking members a short flat gripping section substantially in the plane of movement of said plate, adjacent which is a gripping section shaped to put a bend in a feather gripped therein, the gripping surfaces being roughened.

10. In a fowl plucking device having plucking mechanism and a bladed blower for sucking feathers through said mechanism and a chute connecting the mechanism with the blower, means for disintegrating feathers too long to pass through the blower comprising one or more cutting members positioned in the entrance to the blower in a plane or planes substantially perpendicular to the axis of rotation of the blower.

EDWARD H. HINCHLIFFE.